US008995777B2

(12) United States Patent
Peters et al.

(10) Patent No.: US 8,995,777 B2
(45) Date of Patent: Mar. 31, 2015

(54) IMAGE REGISTRATION APPARATUS

(75) Inventors: Jochen Peters, Norderstedt (DE);
Juergen Weese, Aachen (DE); Helko Lehmann, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 85 days.

(21) Appl. No.: 13/990,530

(22) PCT Filed: Nov. 24, 2011

(86) PCT No.: PCT/IB2011/055277
§ 371 (c)(1),
(2), (4) Date: May 30, 2013

(87) PCT Pub. No.: WO2012/073162
PCT Pub. Date: Jun. 7, 2012

(65) Prior Publication Data
US 2013/0266230 A1 Oct. 10, 2013

(30) Foreign Application Priority Data
Dec. 2, 2010 (EP) ..................................... 10193458

(51) Int. Cl.
*G06K 9/62* (2006.01)
*G06T 7/00* (2006.01)

(52) U.S. Cl.
CPC ............. *G06T 7/0046* (2013.01); *G06T 7/0032* (2013.01); *G06T 2207/10072* (2013.01); *G06T 2207/20016* (2013.01); *G06T 2207/30048* (2013.01)
USPC ......................................................... 382/224

(58) Field of Classification Search
None
See application file for complete search history.

(56) References Cited

U.S. PATENT DOCUMENTS

| 5,633,951 | A | 5/1997 | Moshfeghi |
| 7,653,243 | B2 | 1/2010 | Grady |
| 2009/0103791 | A1 | 4/2009 | Suri et al. |
| 2010/0067768 | A1 | 3/2010 | Ionasec et al. |

OTHER PUBLICATIONS

Brock, K. K., et al.; Improving image-guided target localization through deformable registration; 2008; Acta Oncologica; 47:1279-1285.
Crouch, J. R., et al.; Automated Finite-Element Analysis for Deformable Registration of Prostate Images; 2007; IEEE Trans. on Medical Imaging; 26(10)1379-1390.

(Continued)

*Primary Examiner* — Stephen R Koziol
*Assistant Examiner* — Amandeep Saini

(57) ABSTRACT

The invention relates to an image registration apparatus for registering a first image and a second image with respect to each other. A model, which has a fixed topology, is adapted to the first image for generating a first adapted model and to the second image for generating a second adapted model, and corresponding image elements (40, 48, 49; 50, 58, 9) are determined in the first image and in the second image based on spatial positions of first image elements in the first image with respect to the first adapted model and spatial positions of second image elements in the second image with respect to the second adapted model. Since the model has a fixed topology, corresponding image elements can relatively reliably be found based on the adapted models, even if the first and second images show objects having complex properties like a heart, thereby improving the registration quality.

20 Claims, 7 Drawing Sheets

(56) References Cited

OTHER PUBLICATIONS

Ecabert, O., et al.; Automatic Model-Based Segmentation of the Heart in CT Images; 2008; IEEE Trans. on Medical Imaging; 27(9)1189-1201.

Ecabert, O., et al.; Towards Automatic Full Heart Segmentation in Computed-Tomography Images; 2005; Computers in Cardiology; 32:223-226.

Kaus, M. R., et al.; Assessment of a Model-Based Deformable Image Registration Approach for Radiation Therapy Planning; 2007; Int. J. Radiation Oncology Biol. Phys.; 68(2)572-580.

Lehmann, H., et al.; Integrating Viability Information into a Cardiac Model for Interventional Guidance; 2009; Lecture Notes in Computer Science; vol. 5528:312-320.

Maintz, J. B. A., et al.; A Survey of Medical Image Registration; 1998; Medical Image Analysis; 2(1)1-37.

Peters, J., et al.; Automatic Whole Heart Segmentation in Static Magnetic Resonance Image Volumes; 2007; LNCS 4792:402-410.

Peters, J., et al.; Optimizing boundary detection via Simulated Search with applications to multi-modal heart segmentation; 2010; Medical Image Analysis; 14:70-84.

Peters, J., et al.; Segmentation of the heart and major vascular structures in cardiovascular CT images; 2008; Proc. of SPIE; vol. 6914:691417.

Shih, W-S V., et al.; Volumetric Morphologic Deformation Method for Intersubject Image Registration; 2000; Intl. Journal of Imaging Systems and Technology; 11(2)117-124.

Weese, J., et al.; Shape Constrained Deformable Models for 3D Medical Image Segmentation; 2001; LNCS 2082:380-387.

Weese, J., et al.; The Generation of Patient-Specific Heart Models for Diagnosis and Interventions; 2010; LNCS 6364:25-35.

IMAGE REGISTRATION APPARATUS

FIELD OF THE INVENTION

The invention relates to an image registration apparatus, image registration method and image registration computer program for registering a first image and a second image with respect to each other.

BACKGROUND OF THE INVENTION

U.S. Pat. No. 5,633,951 discloses a three-dimensional imaging method that registers relatively deformed first and second volumetric images of an object which may be obtained from different imaging modalities and/or at different times by performing an elastic geometric transformation on one of the volumetric images. The method includes extracting first and second corresponding surfaces from the respective first and second images, which surfaces delineate the same feature, such as a bone/tissue interface. This is done by extracting a stack of contours for each surface. The first surface is iteratively warped toward alignment with the second surface to arrive at a global translation vector and a set of residual surface distortion vectors. Volume distortion vectors, which are determined by applying a weighting function to the residual surface distortion vectors, are used to indicate the locations in the second volumetric image of voxel centers whose interpolated intensities are to be moved to lattice points. The weighting function includes a constant indicative of elastic stiffness of the second volume. The extraction of the first surface, surface warping, and volume distortion vector determination steps are repeated in successive iterations until a measure of misregistration between the volumetric images is less than a predetermined value.

The quality of this registration method is reduced, if the object comprises complex properties.

SUMMARY OF THE INVENTION

It is an object of the present invention to provide an image registration apparatus, image registration method and image registration computer program for registering a first image and a second image with respect to each other, wherein the registration quality can be improved, in particular, if the object comprises complex properties.

In a first aspect of the present invention an image registration apparatus for registering a first image and a second image with respect to each other is presented, wherein the image registration apparatus comprises:

an image providing unit for providing a first image of a first object and a second image of a second object, wherein the first object and the second object are of the same type, a model providing unit for providing a model of the first object and of the second object, wherein the model has a fixed topology, an adaptation unit for adapting the model to the first image for generating a first adapted model and to the second image for generating a second adapted model, a corresponding image elements determining unit for determining corresponding image elements in the first image and in the second image based on spatial positions of first image elements in the first image with respect to the first adapted model and spatial positions of second image elements in the second image with respect to the second adapted model.

Since the provided model has a fixed topology, corresponding image elements can relatively reliably be found in the first image and in the second image based on spatial positions of first image elements in the first image with respect to the first adapted model and spatial positions of second image elements in the second image with respect to the second adapted model, even if the first and second objects comprise complex properties like a heart, thereby improving the registration quality.

For instance, if the first and second objects are both of the type "heart", on the outside of the left ventricular myocardium are "sliding" surfaces that are complex to model by parametric spatial transformations. Moreover, on the inner side of the myocardium are papillary muscles that have a very high flexibility and are therefore difficult to register. In the blood pool itself no anatomical correspondence between tissues is defined and known registration methods are likely to align on, for example, incidental contrast agent fluctuations. In contrast, by adapting the model having the fixed topology to the first and second objects in the first and second images and by determining corresponding image elements in the two images based on spatial positions of image elements in the first and second images with respect to the respective adapted model, a reliable registration can be achieved, even if the objects comprise complex properties.

The first object and the second object can be the same object, which has been imaged, for example, at different times or by different imaging modalities. The first object and the second object can also be different objects, which are of the same type. For instance, the first object can be an organ of first person and the second object can be the same organ of a second person, in order to compare organs of different persons. Instead of organs other objects of the same type can be shown in the first image and the second image.

If the first and second objects are anatomical objects, anatomically corresponding image locations can be mapped onto each other. In particular, corresponding outer surface elements and inner elements, in particular, inner volume elements, are obtained.

The first object and the second object are preferentially of the type "heart" of a person or of an animal and the model is preferentially a corresponding heart model. In particular, the first object and the second object are preferentially of the type "left ventricular myocardium" and the model is a corresponding model of the left ventricular myocardium. However, the first object and the second object can also be another organ like the lung, another part of a person or an animal, or a technical object, wherein the model corresponds to the respective object.

The adaptation unit is preferentially adapted to start the adaption procedure with a generic model of the first and second object, i.e., for example, a non person or non animal specific model, which is then adapted to the first image and to the second image, respectively, for generating adapted first and second models being person or animal specific.

The image providing unit is, for example, a storage unit in which the first image of the first object and the second image of the second object are stored. However, the image providing unit can also be an imaging modality which generates the first image and the second image. For example, the image providing unit can be a computed tomography unit, a magnetic resonance imaging unit, a nuclear imaging unit like a position emission tomography unit or a single photon emission computed tomography unit, an ultrasound imaging unit, a C-arm X-ray imaging unit, et cetera. The first image and the second image can be generated by the same imaging modality or by different imaging modalities.

The model providing unit is preferentially a storage unit, in which a model of the first and second objects shown in the first image and the second image is stored.

The model comprises preferentially a first structure and a second structure coupled to the first structure. The first structure is preferentially an outer surface structure and the second structure is preferentially an inner structure, wherein the outer surface structure is preferentially an outer surface mesh and the inner structure is preferentially a volumetric mesh. The inner structure can define different parts of a volume of the first object and the second object. These different parts within the volume can be more complex than indicated by a surface structure enclosing the volume. For example, muscle fascicles can have a geometrical distribution inside the volume, which cannot simply by deduced from the surface structure. However, by adapting the inner structure of the model, which is coupled to the outer surface structure of the model, which is also adapted to the object, also different parts within a volume can be distinguished, even if they are not deducible from the outer surface structure alone.

The first structure can be an outer surface structure and the second structure can be an inner structure as described above. However, the first structure can also be an outer one-dimensional line and the second structure can be an inner two-dimensional area enclosed by the one-dimensional line. Moreover, the inner structure can be a structure which completely fills an inner area defined by an outer surface structure or an outer line structure, or the inner structure can be a structure which does not completely fill the inner area.

Instead of a volumetric mesh the inner structure can also comprise other geometric elements, wherein the spatial positions of the other geometrical elements can be determined from the outer surface structure by the coupling of wherein the geometrical elements to the outer surface structure. For example, the inner structure can comprise vertices of a capillary vessel tree, wherein these vertices can be represented by distances between the respective vertex of the inner structure to vertices of the outer surface structure, which are not located on a line. These distances can be modified for adapting the inner structure to the first object in the first image and to the second object in the second image.

If a volumetric mesh is used, it is preferentially composed of tetrahedrons as volumetric cells. But other cells like cuboids can also be used. Alternatively, the inner structure can represent, for example, a bundle of fibers or trees like a vascular tree or a bronchial tree.

Since the model has a fixed topology, the number of model elements forming the model, for example, the number of triangles of a surface mesh and the number of tetrahedrons of a volumetric mesh, and neighboring relations between the model elements, i.e. which model elements are neighbored to which other model elements, are fixed.

It is preferred that the adaptation unit is adapted to
generate the first adapted model by adapting the first structure to the first object and by adapting the second structure using the adapted first structure as boundary condition, and
generate the second adapted model by adapting the first structure to the second object and by adapting the second structure using the adapted first structure as boundary condition. In particular, the first structure is preferentially an outer surface structure, which is adapted to a surface of the respective object, and the second structure is preferentially an inner structure, which is adapted while the outer surface structure is used as boundary condition. Preferentially, the adaptation unit is adapted to deform the outer surface structure for adapting the outer surface structure to the respective object by minimizing a weighted sum of external energy and internal energy. It is further preferred that the adaptation unit is adapted to adapt the second structure, which is preferentially the inner structure, such that the internal energy of the second structure is minimized.

The adaptable inner structure, which is preferentially a volumetric mesh, can be thought of as an elastic "sponge" that relaxes subject to a boundary condition defined by the adapted outer surface structure being preferentially a surface mesh. Preferentially, the inner structure is coupled to the outer surface structure such that outer vertices of the inner structure are identical to vertices of the outer surface structure. The outer surface structure is preferentially used as boundary condition by not moving the outer vertices of the inner structure, which are fixed by the outer surface structure.

It is preferred that the corresponding image elements determining unit is adapted to determine a transformation which transforms features of the first adapted model to corresponding features of the second adapted model and to determine corresponding image elements in the first image and in the second image based on the determined transformation.

Features of the first adapted model and corresponding features of the second adapted model are, for example, vertices of the model. The transformation can be a global transformation which maps all features, in particular, all vertices, of the first adapted model to all corresponding features of the second adapted model. The transformation can also be a local transformation, which maps a first image element within a first model element of the first adapted model to a corresponding second image element of a corresponding second model element of the second adapted model. For instance, the first adapted model and the second adapted model can each be comprised of model elements, wherein the corresponding image elements determining unit is adapted to determine a second image element of the second image, which corresponds to a provided first image element of the first image, by performing following steps:

determining a first model element comprising the first image element of the first image, wherein the first model element is a model element of the first adapted model, determining a second model element being a model element of the second adapted model, wherein the second model element is determined such that it corresponds to the determined first model element, defining a first local coordinate system in the first model element and a second local coordinate system in the second model element with respect to features which are common to the first model element and the second model element, determining a transformation between the first local coordinate system and the second local coordinate system based on positions of the common features in the first image and in the second image, determining the position of the first image element in the first local coordinate system, determining the position of a second image element of the second image, which corresponds to the first image element, in the second local coordinate system depending on the determined position of the first image element in the first local coordinate system and the determined transformation. This further improves the accuracy of determining corresponding image elements in the first image and in the second image.

The model elements of the outer surface structure are preferentially triangles of a surface mesh and the model elements of the inner structure are preferentially tetrahedrons of a volumetric mesh. The common features for defining the local coordinate system can be vertices of the triangles and tetrahedrons. The mapping between the first image and the second image is therefore preferentially defined by the volumetric cell correspondence and by local coordinate systems in the first adapted model and the second adapted model.

It is further preferred that a location is indicated in the provided model, wherein the corresponding image elements determining unit is adapted to determine corresponding image elements in the first image and in the second image, which correspond to the location indicated in the provided model, based on the first adapted model and the second adapted model. It is further preferred that a value is assigned to the location indicated in the provided model, wherein the image registration apparatus further comprises an assigning unit for assigning the value to the image elements of the first image and the second image, which correspond to the location. Thus, locations, in particular, regions, indicated in the provided model, for example, by coloring different regions differently, can be transferred to the first image and the second image, thereby allowing comparing these regions, in the first image and in the second image very easily. The color can be provided by assigning a color value to the location indicated in the provided model. The value assigned to the location indicated in the provided model can also represent another imaging property like contrast, gray value, et cetera.

The provided model is the originally provided model, which may be deformed, for example, via adaptation to the first or second image, or which may be non-deformed, then preferentially representing a sort of template or abstract instance of the object that does not relate to a particular image. The provided model can be regarded as a reference model, wherein a user interface can be provided for allowing a user to indicate the location in the provided model. The corresponding image elements determining unit then determines corresponding image elements in the first image and in the second image, which correspond to the location indicated in the provided model, and these corresponding image elements can be shown a display, for example, by showing graphical elements at the positions of the determined corresponding image elements.

Moreover, the value assigned to the location indicated in the provided model can contain information, which can be mapped to the first adapted model and the second adapted model by assigning the value to the corresponding image elements of the first image and the second image, wherein the assigned values can be visualized and/or used for further processing.

It is further preferred that the image registration apparatus comprises an image value processing unit for processing the image values of the corresponding image elements. For example, image values, in particular, image gray values, of corresponding image elements can easily be compared, or the difference or quotient of image values of corresponding image elements can be formed. The image value processing unit can be adapted to process the image values after it has applied a global gray value difference compensation. The difference can be used, for example, for diagnostic purposes. The global gray value difference compensation compensates possible different overall contrast levels in the first image and in the second image.

It is further preferred that the image value processing unit is adapted to generate a processed value depending on the image values of the corresponding image elements, the corresponding image elements determining unit is adapted to determine a location within the provided model, which corresponds to the corresponding image elements, depending on the spatial position of at least one of the first image element with respect to the first adapted model and of the second image element with respect to the second adapted model, the image registration apparatus further comprises an assigning unit for assigning the processed value to the determined location within the provided model. This allows showing the processed values, for example, a difference or quotient of image values of corresponding image elements, in the provided model. Also unprocessed values of the first image and/or of the second image can be mapped to the provided model and visualized in the provided model.

In a further aspect of the present invention an image registration method for registering a first image and a second image with respect to each other is presented, wherein the image registration method comprises:

providing a first image of a first object and a second image of a second object, wherein the first object and the second object are of the same type, providing a model of the first object and of the second object, wherein the model has a fixed topology, adapting the model to the first image for generating a first adapted model and to the second image for generating a second adapted model, determining corresponding image elements in the first image and in the second image based on spatial positions of first image elements in the first image with respect to the first adapted model and spatial positions of second image elements in the second image with respect to the second adapted model.

In a further aspect of the present invention an image registration computer program for registering a first image and a second image is presented, wherein the image registration computer program comprises program code means for causing an image registration apparatus as defined in claim 1 to carry out the steps of the image registration method as defined in claim 14, when the image registration computer program is run on a computer controlling the image registration apparatus.

It shall be understood that image registration apparatus of claim 1, the image registration method of claim 14, and the image registration computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
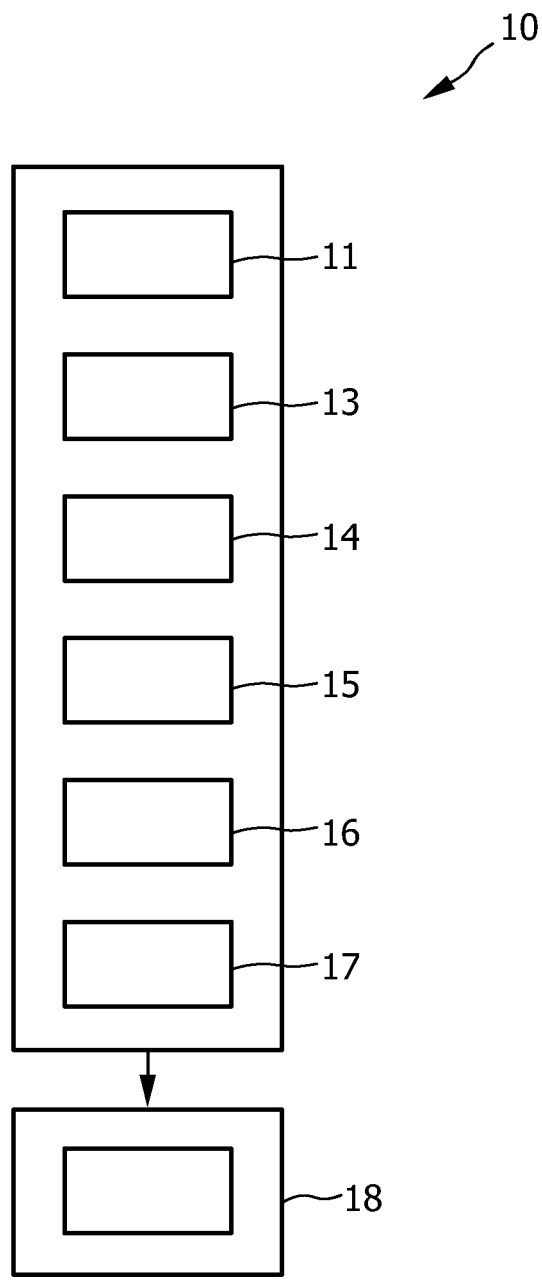
FIG. 1 shows schematically and exemplarily an embodiment of an image registration apparatus for registering a first image and a second image.

FIG. 1 shows schematically and exemplarily an image registration apparatus for registering a first image and a second image with respect to each other. The image registration apparatus 10 comprises an image providing unit 11 for providing a first image and a second image of a same object, i.e. the first object and the second object are, in this embodiment, the same object. The image registration apparatus 10 further comprises a model providing unit 13 for providing a model of the object having a fixed topology, an adaptation unit 14 for adapting the model to the first image for generating a first adapted model and to the second image for generating a second adapted model, and a corresponding image element determining unit 15 for determining corresponding image elements in the first image and in the second image based on spatial positions of first image elements in the first image with respect to the first adapted model and spatial positions of second image elements in the second image with respect to the second adapted model.

In this embodiment, the object is a heart of a person or of an animal and the model is a corresponding heart model. In particular, the object is the left ventricular myocardium and the model is a corresponding model of the left ventricular myocardium. The model providing unit 13 is preferentially a storage unit in which the respective model of the object is stored and from which the respective model can be retrieved.

Figure 2:
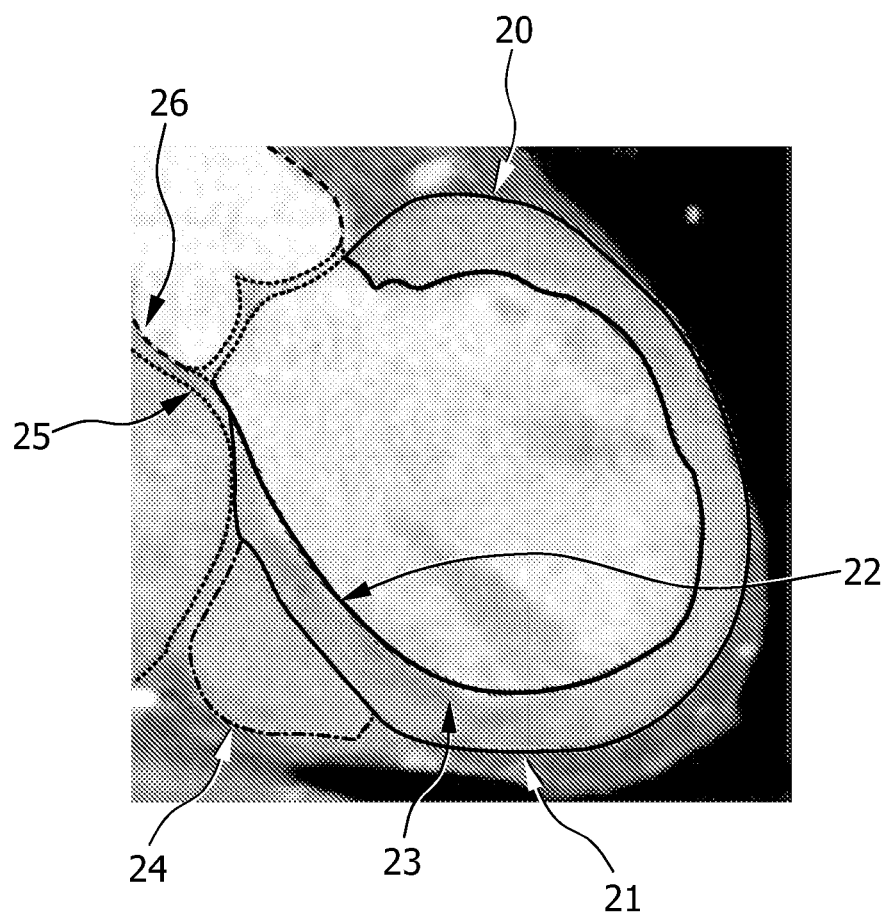
FIG. 2 shows schematically and exemplarily a model of a heart adapted to a heart shown in an image.

FIG. 2 shows schematically and exemplarily an image of a heart 20 of a person and a model 21, which has been adapted to the left ventricular myocardium of the heart 20. The model 21 comprises an outer surface structure being an outer surface mesh 22, which represents, in this embodiment, the endocardium and the epicardium and which encloses an inner structure 23. The terms "outer" and "inner" mean therefore that the surface structure, i.e. the outer surface structure, encloses the inner structure. In this embodiment, the inner structure is a volumetric mesh. In FIG. 2, the model 21 comprises further outer surface meshes 24, 25, 26, which generally could also enclose a respective inner structure, in particular, a respective inner volumetric mesh. However, in this embodiment, the region of interest is the left ventricular myocardium and the volumetric mesh 23 is therefore only inserted into this region of interest enclosed by the outer surface mesh 22.

The volumetric mesh 23 is composed of tetrahedrons as volumetric cells.

Since the model 21 has a fixed topology, the number of tetrahedrons forming the inner volumetric mesh and the number of triangles forming the outer surface mesh and the neighbouring relations between these model elements, i.e. which model elements are neighboured to which other model elements, are fixed.

The inner volumetric mesh 23 is coupled to the outer surface mesh 22, i.e. outer vertices of the inner volumetric mesh 23 are identical to vertices of the outer surface mesh 22.

The model 21 is preferentially a three-dimensional model, which is adapted to first and second three-dimensional images of the heart, in particular, of the left ventricular myocardium. FIG. 2 shows schematically and exemplarily a cross section of the three-dimensional model 21 adapted to a three-dimensional computed tomography image of the heart 20.

The image providing unit 11 is, for example, a storage unit in which the first image and the second image of the same heart 20 are stored. However, the image providing unit can also be an imaging modality which generates the first image and the second image and which is schematically and exemplarily shown in FIG. 3.

Figure 3:
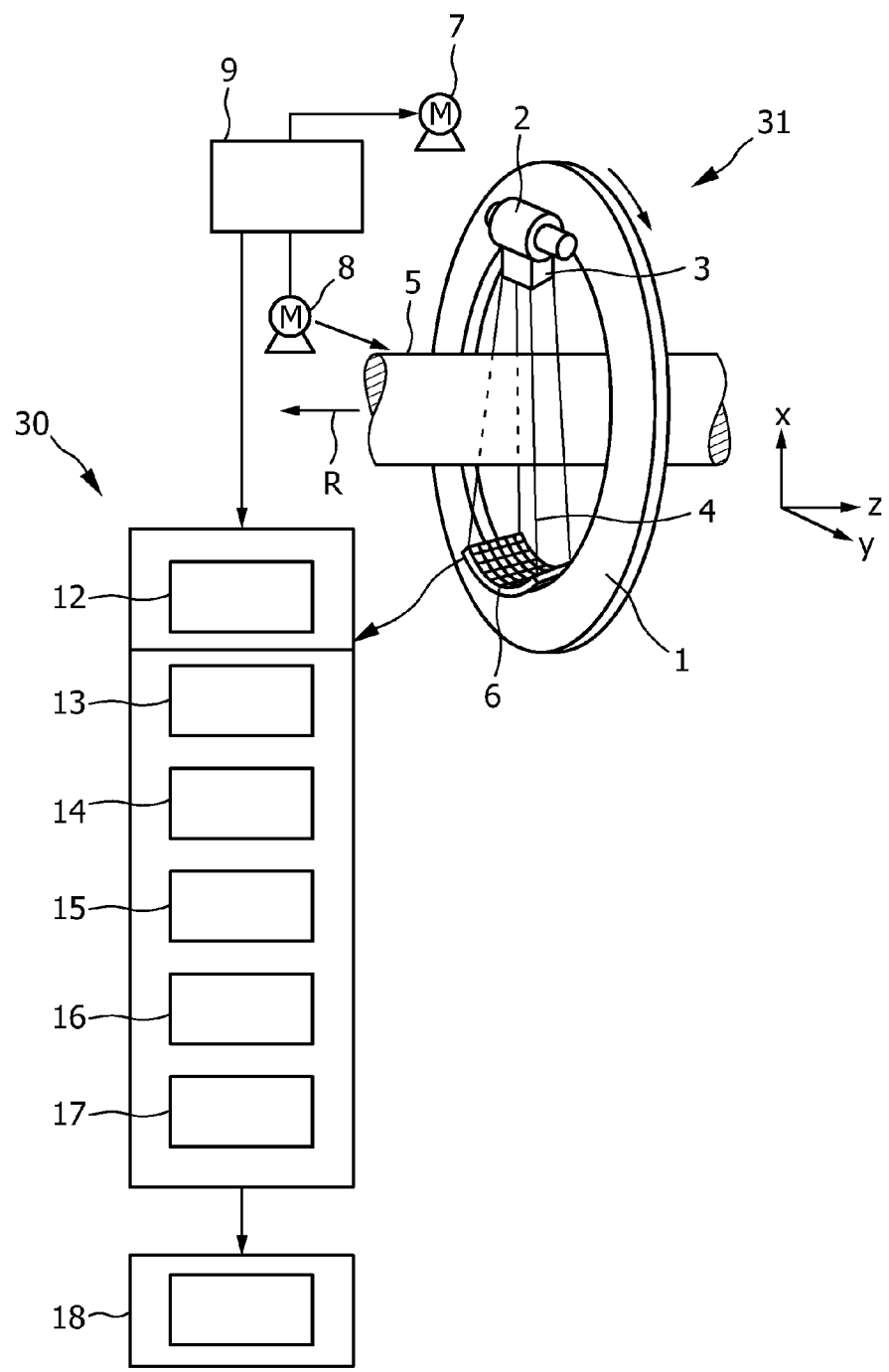
FIG. 3 shows an embodiment of the image registration apparatus comprising a computed tomography system for generating computed tomography images.

In FIG. 3, the image registration apparatus 30 comprises an image providing unit 31 being a computed tomography system. The computed tomography system includes a gantry 1 which is capable of rotation about a rotational axis R which extends parallel to the z-direction. A radiation source, which is, in this embodiment, an x-ray tube, is mounted on the gantry 1. The radiation source 2 is provided with a collimator 3, which forms, in this embodiment, a conical radiation beam 4 from the radiation generated by the radiation source 2. The radiation traverses the object (not shown), and the region of interest, which is, in this embodiment, the left ventricular myocardium, in an examination zone 5 being, in this embodiment, cylindrical. After having traversed the examination zone 5 the radiation beam 4 is incident on a detection device 6, which comprises a two-dimensional detection surface. The detection device 6 is mounted on the gantry 1.

The computed tomography system comprises two motors 7, 8. The gantry 1 is driven at a preferably constant but adjustable angular speed by the motor 7. The motor 8 is provided for displacing the object, for example, a patient, who is arranged on a patient table in the examination zone 5, parallel to the direction of the rotational axis R or the z-axis. These motors 7, 8 are controlled by a control unit 9, for instance, such that the radiation source and the examination zone 5 and, thus, the region of interest within the examination zone 5 move relatively to each other along a trajectory which may be helical or circular, wherein, if the trajectory is a circular trajectory, the patient table is not moved. Instead of forming a cone beam, the collimator 3 can also be adapted to form another beam like a fan bean, wherein then the detection device 6 can comprise a detection surface, which is shaped corresponding to the other beam shape.

During a relative movement of the radiation source 2 and the object 20 the detection device 6 generates measured values depending on the radiation incident on the detection surface of the detection device 6. The measured values are projection data which are provided to a reconstruction unit 12 for reconstructing first and second images of the object. Known reconstruction algorithms can be used like a filtered backprojection algorithm for reconstructing the first and second images. In particular, a known movement correction can be performed based on movement values measured while the projection data are acquired. These movement values are, for example, values of an electrocardiogram. The image providing unit can also be another imaging modality not being a computed tomography system like a magnetic resonance imaging system, a nuclear imaging system, an ultrasound imaging system, a C-arm x-ray imaging system, et cetera. The first image and the second image can be generated by the same imaging modality or by different imaging modalities.

The adaption unit 14 is adapted to adapt the outer surface mesh 22 to the surface of the left ventricular myocardium and to adapt the inner volumetric mesh 23 using the outer surface mesh 22 as a boundary condition. The volumetric mesh 23 can be thought of an elastic "sponge" that relaxes subject to a boundary condition defined by the adapted outer surface mesh 22. The inner volumetric mesh 23 is coupled to the outer surface mesh 22 such that the outer vertices of the inner volumetric mesh 23 are identical to the vertices of the outer surface mesh 22. The outer surface mesh 22 is used as a boundary condition by not moving the outer vertices of the inner volumetric mesh, which are fixed by the outer surface mesh 22, while adapting the inner volumetric mesh 23. For adapting the outer surface mesh 22 to the surface of the left ventricular myocardium the outer surface mesh is deformed and for adapting the inner volumetric mesh 23 to the left ventricular myocardium the inner volumetric mesh 23 is adapted such that the internal energy of the inner volumetric mesh 23 is minimized, while the outer vertices of the inner volumetric mesh 23, which correspond to the vertices of the outer surface mesh 22, are fixed. These adaptations of the outer surface mesh 22 and the inner volumetric mesh 23 will in the following be exemplarily described in more detail.

For adapting the outer surface mesh 22, the boundary of the object is detected in the respective image by using known boundary detection algorithms like the boundary detection algorithm disclosed in the article "Optimizing boundary detection via Simulated Search with applications to multi-modal heart segmentation" by J. Peters et al., Medical Image Analysis, pages 70-84 (2010). Then, the vertices of the outer surface mesh 22 are modified such that the sum of external energy and internal energy is minimized, thereby deforming the outer surface mesh and adapting the same to the respective object. The external energy decreases, if deviations between the detected boundary and the outer surface mesh decrease, and the internal energy decreases, if deviations between a shape model, which is registered with the deforming model being adapted to the respective image and which corresponds to a surface of the object, and the outer surface mesh 22 decrease. For more details regarding the known concept of external energy and internal energy reference is made to the articles "Shape constrained deformable models for 3D medical image segmentation" by J. Weese et al., In Proc. IPMI, pages 380-387 (2001), and "Automatic Model-Based Segmentation of the Heart in CT Images" by O. Ecabert et al., IEEE Trans. Med. Imaging 27(9), pages 1189-1201 (2008), which are herewith incorporated by reference.

The inner volumetric mesh 23 is preferentially adapted by minimizing the internal energy, which decreases, if deviations between a shape model, which is registered with the deforming model being adapted under the boundary conditions imposed by the outer surface mesh 22 and which represents the shape of the inner structure of the object, and the adapted volumetric mesh 23 decrease.

The shape models are predefined and can be stored in the adaptation unit 14. A shape model defines the shape of the inner and/or outer structures of the respective object and can be generated by, for example, averaging over several segmented objects of the same type. For determining the internal energy, the respective shape model is preferentially just registered with the deforming model being adapted to the respective image and deviations like the squared difference between edges or vertices of the shape model and the model being adapted are determined.

The corresponding image element determining unit 15 is adapted to determine a second image element of the second image, which corresponds to a provided first image element of the first image, by firstly determining a first model element comprising the provided first image element of the first image, wherein the first model element is a model element of the first adapted model. Then, a second model element being a model element of the second adapted model is determined, wherein the second model element is determined such that it corresponds to the determined first model element. A first local coordinate system is defined in the first model element and a second local coordinate system is defined in the second model element with respect to features which are common to the first model element and the second model element, wherein a transformation is determined between the first local coordinate system and the second local coordinate system based on positions of the common features in the first image and in the second image. The position of the first image element is determined in the first local coordinate system, and the position of a second image element of the second image, which corresponds to the first image element, in the second local coordinate system is determined depending on the determined position of the first image element in the first local coordinate system and the determined transformation.

This determination of a second image element, which corresponds to a provided first image element, will in the following be illustrated with reference to FIG. 4.

Figure 4:
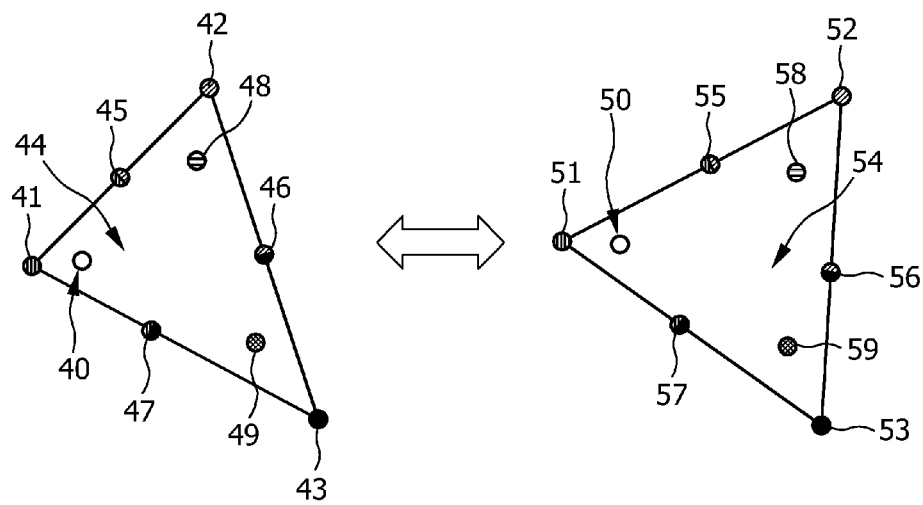
FIG. 4 illustrates a spatial relationship between image elements of the first image and the second image.

In the example illustrated in FIG. 4, a first image element 40 is provided in the first image. This providing of a first image element can be performed by, for example, a user via a graphical user interface, which allows the user to select a certain first image element in the first image. After the first image element 40 has been provided, it is determined in which first model element 44 of the first adapted model the provided first image element 40 is located. Then, a second model element 54 of the second adapted model is determined, wherein the second model element 54 is determined such that it corresponds to the determined first model element 44. A first local coordinate system in the first model element 44 and a second local coordinate system in the second model element 54 are determined based on the vertices 41 . . . 43 of the first model element 44, the vertices 51 . . . 53 of the second model element 54, the intermediate points between two vertices 45 . . . 47 of the first model element 44 and the intermediate points 55 . . . 57 between vertices 51 . . . 53 of the second model element 54. A transformation between the first local coordinate system and the second local coordinate system is based on the positions of these common features in the first image and in the second image. Then, the position of the first image element 40 in the first local coordinate system is determined, and the position of a second image element 50 of the second image, which corresponds to the first image element 40, in the second local coordinate system is determined depending on the determined position of the first image element 40 in the first local coordinate system and the determined transformation. The determined transformation can of course also be used for finding other corresponding image elements. For example, the transformation can be used for determining that the second image element 59 corresponds to the first image element 49 and the second image element 58 corresponds to the first image element 48.

The common features, which are used for establishing a transformation between the first image and the second image, can also be only the vertices, only the intermediate points between the vertices or other features of corresponding model elements, in particular, of corresponding triangles or tetrahedrons. To establish a geometric mapping between the first image and the second image different approaches using the mesh vertex coordinates in both images are conceivable. One approach is to establish a linear geometric coordinate transformation within tetrahedral volumetric cells of the inner volumetric mesh 23 and/or within triangles of the outer surface mesh 22. Preferentially, the vertices of the triangles or tetrahedrons are used to define a linear transformation inside the respective structure.

For example, the first local coordinate system can be defined by the vectors defining the vertices of the first model element and the second local coordinate system can be defined by the vectors of the vertices of the second model element. Each first image element within the first model element can then be defined as a linear combination of the vectors of the vertices of the first model element. The weights of this linear combination can then be used for linearly combining the corresponding vectors of the vertices of the second model element, which corresponds to the first model element, in order to determine second image elements within the second model element, which correspond to first image elements within the first model element.

Figure 5:
FIG. 5 shows schematically and exemplarily an image of a heart of a person in a rest state.
Figure 6:
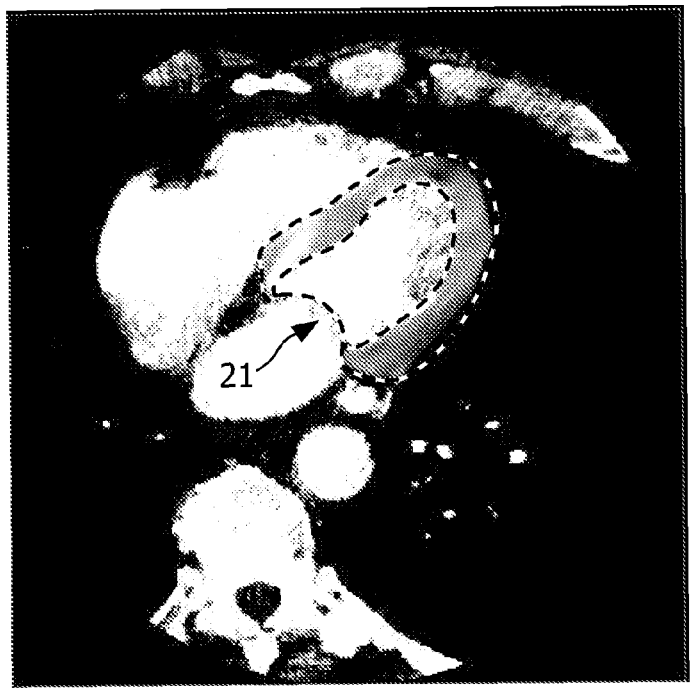
FIG. 6 shows schematically and exemplarily an image of the heart of the person in a stress state.
Figure 7:
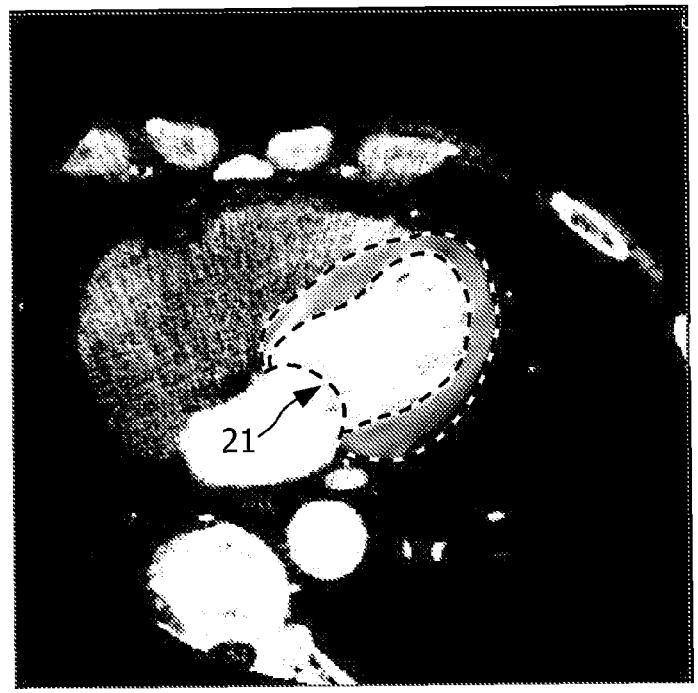
FIG. 7 shows schematically and exemplarily gray values of the image shown in FIG. 6 mapped onto the image shown in FIG. 5.

FIG. 5 shows schematically and exemplarily a first image of a heart of a person, which corresponds to a rest condition of the person. FIG. 6 shows schematically and exemplarily a second image of the heart of the person, wherein the second image corresponds to a stress condition of the person. Corresponding image elements in the first image and in the second image can be determined as described above by adapting a heart model 21 having a fixed topology to the heart shown in the first and second images such that a first adapted model representing the rest condition and a second adapted model representing the stress condition are generated. The corresponding image elements determining unit uses these adapted first and second models for determining corresponding image elements in the first and second images, i.e. for registering the first and second images. Based on the registration the gray values of the second stress-image can be mapped into the first rest image in the area of the myocardium. The resulting combined image is schematically and exemplarily shown in FIG. 7. In this example, the heart model 21 is a model of the myocardium and the combined image comprises the image values of the myocardium of the second image shown in FIG. 6 and the other image values from the first image shown in FIG. 5.

The image registration apparatus further comprises an image value processing unit 16 for processing the image values of the corresponding image elements. For example, image values, in particular, image gray values, of corresponding image elements can easily be compared, for instance, by calculating the difference or quotient of image values of corresponding image elements. Preferentially, the image value processing unit firstly performs a global gray value difference compensation on the first image and the second image.

In order to perform the global gray value difference compensation, an average value, in particular, a mean or median value, of image values within a region of interest, in this embodiment, within the myocardium, can be calculated for the first image and for the second image, wherein a difference between the average determined for the first image and the average determined for the second image can be added to the image values of the first image or of the second image, respectively, in order to compensate for the difference in the averages.

The image value processing unit 16 is adapted to generate a processed value depending on the image values of the corresponding image elements, wherein the corresponding image elements determining unit 15 is adapted to determine an location within the non-adapted model, which corresponds to the corresponding image elements, depending on the spatial position of at least one of the first image element with respect to the first adapted model and of the second image element with respect to the second adapted model. In particular, the corresponding image elements determining unit 15 can be adapted to use the common features, for example, the vertices of the respective model element, for determining a transformation, which is based on local coordinates systems and which transforms a location within a model element in the first adapted model or the second adapted model to a location within a corresponding model element of the non-adapted model, as described above. The image registration apparatus further comprises an assigning unit 17 for assigning the processed value to the determined location of the non-adapted model. The processed value can also be assigned to the respective first image element in the first image, the respective second image element in the second image and/or a deformed provided model, which is not adapted to the first image or the second image. The resulting non-adapted model with the processed value or with the processed values, if processed values are determined for several locations within the model, can be shown on a display 18. Also other images and/or adapted models can be shown on the display 18. For instance, the first image, the first adapted model, the second image and/or the second adapted model can be shown on the display 18.

Figure 8:
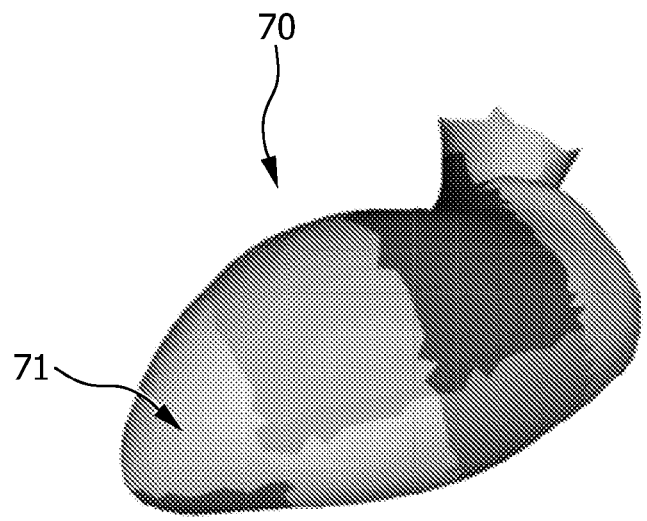
FIG. 8 shows schematically and exemplarily a model of a heart comprising AHA segments.
Figure 9:
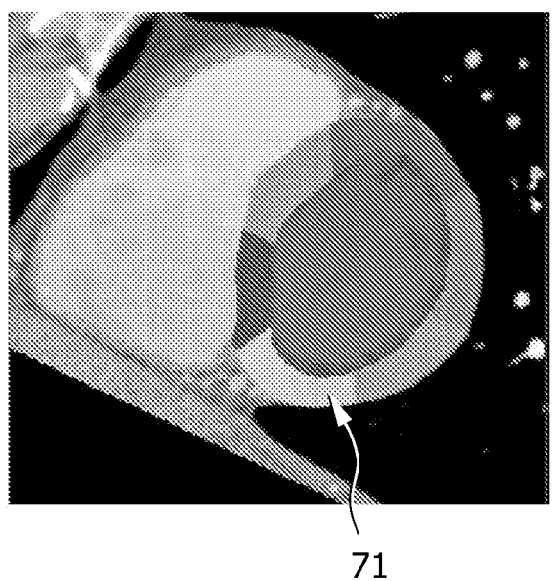
FIG. 9 shows schematically and exemplarily an image to which the AHA segments of the model shown in FIG. 8 have been mapped.

In an embodiment, certain locations, in particular, certain regions, are indicated in the non-adapted model. Such a model 70 of a heart comprising indicated locations, in particular, indicated regions 71, is schematically and exemplary shown in FIG. 8. In FIG. 8, the different regions 71 are indicated by different color values assigned to the different regions 71. In other embodiments, also other kinds of values can be assigned to the regions 71 for indicating the same like gray values or contrast values. Also other kinds of information can be assigned to regions of the model like vascular fibre directions. In FIG. 8, the different indicated regions are AHA (American Heart Association) segments. The corresponding image elements determining unit 15 is adapted to determine corresponding image elements in the first image and in the second image, which correspond to the respective location indicated in the non-adapted model, based on the first adapted model and the second adapted model. In particular, as described above, common features of corresponding model elements in the non-adapted model, the first adapted model and the second adapted model can be used for determining transformations between local coordinate systems of corresponding model elements in the non-adapted model, the first adapted model and the second adapted model. The corresponding image elements determining unit 50 is preferentially adapted to use these transformations for determining corresponding image elements in the first image and in the second image, which correspond to, for example, the regions 71 of the heart model 70 shown in FIG. 8. The assigning unit 17 is preferentially adapted to assign the values, in this embodiment, the color values, of the different regions 71 of the non-adapted heart model 70 to the determined corresponding image elements of the first image and the second image. A resulting image, which may be the first image or the second image, is schematically and exemplarily shown in FIG. 9. Since, in this embodiment, the first image and the second image have been colored in accordance with AHA segments, these segments can easily be compared in the first image and the second image.

Figure 10:
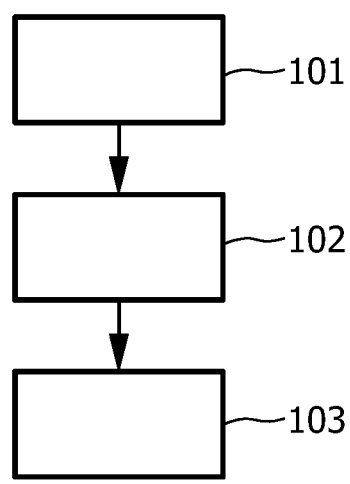
FIG. 10 shows a flowchart exemplarily illustrating an embodiment of an image registration method for registering a first image and a second image with respect to each other.

In the following an embodiment of an image registration method for registering a first image and a second image with respect to each other will exemplarily be described with reference to a flowchart shown in FIG. 10.

In step 101, a model 21 of the object 20 is provided comprising a fixed topology. The model 21 is preferentially a generic model. In step 102, the model 21 is adapted to the first image for generating a first adapted model and to the second image for generating a second adapted model. The model 21 comprises preferentially an outer surface structure 22 and an inner structure 23, wherein the outer surface structure 22 is preferentially deformed, in order to adapt the outer surface structure 22 to the object in the respective image, and wherein the inner structure 23 is preferentially adapted such that the internal energy is minimized, while the deformed outer surface structure is used as a boundary condition. In step 103, corresponding image elements in the first image and in the second image are determined based on spatial positions of the first image elements in the first image with respect to the first adapted model and spatial positions of second image elements in the second image with respect to the second adapted model. In particular, transformations between local coordinate systems of corresponding model elements of the first adapted model and the second adapted model are determined based on positions of common features like vertices of the model elements, wherein the determined transformations are used for determining the corresponding image elements in the first image and in the second image.

The image registration apparatus and method can be used to compare image gray values at corresponding anatomical positions for two or more images. Such a comparison has numerous applications as, for instance, perfusion analysis. In particular, the image registration apparatus and method can be used for perfusion analysis in general and the analysis of cardiac perfusion computed tomography data. The image registration apparatus and method can also be used to compare gray values in images during follow-up studies or to fuse image information from different modalities.

The image registration apparatus and method can be used for registration, analysis and comparison of image pairs and/or image sequences, wherein the underlying technique relies preferentially on mesh-based segmentation. The image registration apparatus and method allow the mapping of anatomically corresponding image locations onto each other, comparing the gray values of displacements in two or more images and analyzing them. Furthermore, information can be integrated into the model, for example, the AHA segments can be integrated into the model, and meaningless comparisons in non-target regions, for example, in regions of the first image or the second image, which are not AHA segments, can be avoided.

There is a variety of functionality that can be realized by the image registration apparatus and method, in particular, by the model-based registration approach. For example, the image registration apparatus and method allow mapping of a position indicated in the first image onto the second image inside a target region, for example, inside the left ventricular myocardium. Furthermore, gray values can be mapped inside the target region from one image into a second image as illustrated in, for example, FIG. 7. Original and mapped gray values can be compared, for example, for rest-stress comparison for myocardial perfusion, possibly after applying a global gray value difference compensation, for instance, if the overall contrast level in the organ has changed between different acquisitions. The gray value differences can then be used for diagnostic purposes.

The non-adapted model is preferentially a generic model defining a reference space. A position indicated in the reference space, i.e. a position or location indicated in the non-adapted model, can be mapped to both images, or the gray value information of both images at the indicated position may be processed, for example, by subtraction, division, et cetera, and mapped into the reference space. Within the mapping, additional information encoded in the model can be visualized such as AHA segments as described above with reference to FIGS. 8 and 9 or such as the layer to which a tissue element belongs to. For example, it can be encoded in the model whether the respective element, which represents a tissue element, belongs to the endocardium, myocardium or the epicardium.

The image registration apparatus and method can be adapted to compare, apart from the gray values, other properties of the model elements, in particular, of the volumetric cells or the surface model elements, between different images. For example, geometric displacements in a time series of images can be determined and used for reconstructing motion fields, wherein these motion fields can then be visualized or analysed, for example, for detecting motion artifacts in the myocardium.

For instance, the positions of corresponding model elements in different images can be used for determining displacement vectors, wherein corresponding velocities and, thus, movements can be determined based on the displacement vectors and the times at which the different images have been acquired.

Moreover, the comparison of corresponding image elements in different images can be used for perfusion analysis. For example, it is assumed that infarct regions of the heart have under stress conditions other image values than under rest conditions, in particular, it is assumed that under stress conditions infarct regions comprise darker gray values than under rest conditions. If the first image represents a rest condition and if the second image represents a stress condition, corresponding image values in these two images can be compared and it can be determined which regions of the images comprise differences in image values of corresponding image elements, which indicate an infarct region. In particular, it can be determined in which regions of the two images the image values of the second image are more than a threshold value darker than the corresponding image values of the first image. The threshold value can be determined by calibration measurements.

Although in the above described embodiments the object is a heart, in particular, the left ventricular myocardium, the image registration apparatus and method can also be adapted to register images of another object like another organ or like a technical object.

Although in the above described embodiments a first image and a second image are registered with respect to each other, the image registration apparatus and method can also be adapted to register more than two images, in particular, a sequence of images, with respect to each other.

Although in the above described embodiments the first structure is an outer surface structure and the second structure is an inner structure enclosed by the outer surface structure, the second structure can be any structure coupled to the first structure by a known spatial relation between the first structure and the second structure, wherein the spatial relation can for example be defined by distances between vertices of the first structure and vertices of the second structure or by vectors connecting vertices of the first structure with vertices of the second structure. In an embodiment, the second structure does not need to be located within the first structure.

Although in the above described embodiments the model is preferentially a three-dimensional model, the model can also be a two-dimensional model, wherein, in this case, the model comprises preferentially an outer mesh being a one-dimensional contour and an inner mesh composed of two-dimensional model elements, in particular, composed of triangles.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations, calculations, adaptations, et cetera performed by one or several units or devices can be performed by any other number of units or devices. For example, steps 101 to 103 can be performed by a single unit or by any other number of different units. The calculations, determinations, adaptations et cetera and/or the control of the image registration apparatus in accordance with the image registration method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an image registration apparatus for registering a first image and a second image with respect to each other. A model, which has a fixed topology, is adapted to the first image for generating a first adapted model and to the second image for generating a second adapted model, and corresponding image elements are determined in the first image and in the second image based on spatial positions of first image elements in the first image with respect to the first adapted model and spatial positions of second image elements in the second image with respect to the second adapted model. Since the model has a fixed topology, corresponding image elements can relatively reliably be found based on the adapted models, even if the first and second images show objects having complex properties like a heart, thereby improving the registration quality.

The invention claimed is:

1. An image registration apparatus for registering a first image and a second image with respect to each other, the image registration apparatus comprising:
   an image providing unit for providing a first image of a first object and a second image of a second object, wherein the first object and the second object are of the same type,
   a model providing unit for providing a model of the first object and of the second object, wherein a number of model elements of the model and neighboring relations between the model elements are fixed,
   an adaptation unit for adapting the model to the first image for generating a first adapted model and to the second image for generating a second adapted model, wherein the adaptation unit is adapted to determine an internal energy by registering a shape model with the provided model and by determining deviations between the shape model and the provided model for adapting the provided model to the first image and to the second image, and
   a corresponding image elements determining unit for determining corresponding image elements in the first image and in the second image based on spatial positions of first image elements in the first image with respect to the first adapted model and spatial positions of second image elements in the second image with respect to the second adapted model.

2. The image registration apparatus as defined in claim 1, wherein the model comprises a first structure and a second structure coupled to the first structure.

3. The image registration apparatus as defined in claim 2, wherein the first structure is an outer surface structure and the second structure is an inner structure.

4. The image registration apparatus as defined in claim 3, wherein the outer surface structure is an outer surface mesh.

5. The image registration apparatus as defined in claim 3, wherein the inner structure is a volumetric mesh.

6. The image registration apparatus as defined in claim 2, wherein the adaptation unit is adapted to
   generate the first adapted model by adapting the first structure to the first object and by adapting the second structure using the adapted first structure as boundary condition, and
   generate the second adapted model by adapting the first structure to the second object and by adapting the second structure using the adapted first structure as boundary condition.

7. The image registration apparatus as defined in claim 6, wherein the adaptation unit is adapted to adapt the second structure such that the internal energy of the second structure is minimized.

8. The image registration apparatus as defined in claim 1, wherein the corresponding image elements determining unit is adapted to determine a transformation which transforms features of the first adapted model to corresponding features of the second adapted model and to determine corresponding image elements in the first image and in the second image based on the determined transformation.

9. The image registration apparatus as defined in claim 1, wherein the first adapted model and the second adapted model are each comprised of model elements, wherein the corresponding image elements determining unit is adapted to determine a second image element of the second image, which corresponds to a provided first image element of the first image, by performing following steps:
   determining a first model element comprising the first image element of the first image, wherein the first model element is a model element of the first adapted model,
   determining a second model element being a model element of the second adapted model, wherein the second model element is determined such that it corresponds to the determined first model element,
   defining a first local coordinate system in the first model element and a second local coordinate system in the second model element with respect to features which are common to the first model element and the second model element,
   determining a transformation between the first local coordinate system and the second local coordinate system based on positions of the common features in the first image and in the second image,
   determining the position of the first image element in the first local coordinate system,
   determining the position of a second image element of the second image, which corresponds to the first image element, in the second local coordinate system depending on the determined position of the first image element in the first local coordinate system and the determined transformation.

10. The image registration apparatus as defined in claim 1, wherein a location is indicated in the provided model and wherein the corresponding image elements determining unit is adapted to determine corresponding image elements in the first image and in the second image, which correspond to the location indicated in the provided model, based on the first adapted model and the second adapted model.

11. The image registration apparatus as defined in claim 10, wherein a value is assigned to the location indicated in the provided model and wherein the image registration apparatus further comprises an assigning unit for assigning the value to the image elements of the first image and the second image, which correspond to the location.

12. The image registration apparatus as defined in claim 1, wherein the image registration apparatus further comprises an image value processing unit for processing the image values of the corresponding image elements.

13. The image registration apparatus as defined in claim 12, wherein
the image value processing unit is adapted to generate a processed value depending on the image values of the corresponding image elements,
the corresponding image elements determining unit is adapted to determine a location within the provided model, which corresponds to the corresponding image elements, depending on the spatial position of at least one of the first image element with respect to the first adapted model and of the second image element with respect to the second adapted model,
the image registration apparatus further comprises an assigning unit for assigning the processed value to the determined location within the provided model.

14. An image registration method for registering a first image and a second image with respect to each other, the image registration method comprising:
providing a first image of a first object and a second image of a second object, wherein the first object and the second object are of the same type,
providing a model of the first object and of the second object, wherein a number of model elements of the model and neighboring relations between the model elements are fixed,
adapting the model to the first image for generating a first adapted model and to the second image for generating a second adapted model, wherein an internal energy is determined by registering a shape model with the provided model and by determining deviations between the shape model and the provided model for adapting the provided model to the first image and to the second image, and
determining corresponding image elements in the first image and in the second image based on spatial positions of first image elements in the first image with respect to the first adapted model and spatial positions of second image elements in the second image with respect to the second adapted model.

15. A non-transitory computer readable medium encoded with computer executable instruction of an image registration computer program, which, when executed by a computer, causes the computer to:
provide a first image of a first object and a second image of a second object, wherein the first object and the second object are of the same type,
provide a model of the first object and of the second object, wherein a number of model elements of the model and neighboring relations between the model elements are fixed,
adapt the model to the first image for generating a first adapted model and to the second image for generating a second adapted model, wherein the adaptation unit is adapted to determine an internal energy by registering a shape model with the provided model and determining deviations between the shape model and the provided model for adapting the provided model to the first image and to the second image, and
determine corresponding image elements in the first image and in the second image based on spatial positions of first image elements in the first image with respect to the first adapted model and spatial positions of second image elements in the second image with respect to the second adapted model.

16. The non-transitory computer readable medium of claim 15, wherein the model comprises a first structure and a second structure coupled to the first structure.

17. The non-transitory computer readable medium of claim 16, wherein the first structure is an outer surface structure and the second structure is an inner structure.

18. The non-transitory computer readable medium of claim 17, wherein the outer surface structure is an outer surface mesh.

19. The non-transitory computer readable medium of claim 17, wherein the inner structure is a volumetric mesh.

20. The non-transitory computer readable medium of claim 16, wherein executing the computer executable instruction causes the computer further to:
generate the first adapted model by adapting the first structure to the first object and by adapting the second structure using the adapted first structure as boundary condition, and
generate the second adapted model by adapting the first structure to the second object and by adapting the second structure using the adapted first structure as boundary condition.

* * * * *